United States Patent
Codrescu et al.

(10) Patent No.: US 8,140,823 B2
(45) Date of Patent: Mar. 20, 2012

(54) MULTITHREADED PROCESSOR WITH LOCK INDICATOR

(75) Inventors: Lucian Codrescu, Austin, TX (US); Erich James Plondke, Austin, TX (US); Suresh Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 745 days.

(21) Appl. No.: 11/949,284

(22) Filed: Dec. 3, 2007

(65) Prior Publication Data

US 2009/0144519 A1    Jun. 4, 2009

(51) Int. Cl.
G06F 12/10 (2006.01)

(52) U.S. Cl. .. 711/207; 711/208; 711/145; 711/E12.058

(58) Field of Classification Search .................. 711/207, 711/208, 145, E12.058
See application file for complete search history.

(56) References Cited

U.S. PATENT DOCUMENTS

| | | | |
|---|---|---|---|
| 6,742,103 B2 | 5/2004 | Chauvel et al. | |
| 6,754,784 B1 * | 6/2004 | North et al. | 711/145 |
| 7,188,229 B2 * | 3/2007 | Lowe | 711/207 |
| 7,213,093 B2 | 5/2007 | Hammarlund et al. | |
| 7,398,371 B2 | 7/2008 | Plondke et al. | |
| 7,617,379 B2 * | 11/2009 | Hirano et al. | 711/207 |
| 2001/0052053 A1 | 12/2001 | Nemirovsky et al. | |
| 2005/0235134 A1 | 10/2005 | O'Sullivan | |
| 2007/0136725 A1 | 6/2007 | Accapadi et al. | |

FOREIGN PATENT DOCUMENTS

KR    20060029151 A    4/2006

OTHER PUBLICATIONS

International Search Report-PCT/US08/085402, International Search Authority-European Patent Office—Mar. 30, 2009.
Written Opinion-PCT/US08/085402, International Search Authority-European Patent Office—Mar. 30, 2009.

* cited by examiner

Primary Examiner — Pierre-Michel Bataille
(74) Attorney, Agent, or Firm — Peter M. Kamarchik; Nicholas J. Pauley; Jonathan T. Velasco

(57) ABSTRACT

Systems and methods including a multithreaded processor with a lock indicator are disclosed. In an embodiment, a system includes means for indicating a lock status of a shared resource in a multithreaded processor. The system includes means for automatically locking the shared resource before processing exception handling instructions associated with the shared resource. The system further includes means for unlocking the shared resource.

29 Claims, 5 Drawing Sheets

MULTITHREADED PROCESSOR WITH LOCK INDICATOR

I. FIELD

The present disclosure is generally related to a multithreaded processor with a lock indicator.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Additional computing capabilities are enabled by multithreaded processors that can process multiple threads concurrently at an electronic device. To reduce power consumption and cost of manufacture, multithreaded processors typically are designed so that some processing resources, such as caches, buses, or other resources, are shared by multiple threads. However, certain operations may only be reliably performed at a shared resource by a single thread. For example, unpredictable results can arise when a memory address is written to by two different threads concurrently. Software locks can be used to manage shared resources by providing a value in memory, such as a semaphore, that indicates whether the shared resource is unlocked and available for use by a particular process, or locked and unavailable for use.

Software locks are typically set and released by software instructions and may be unreliable, such as when the software lock is accessed by poorly written or malicious software. In addition, while a shared resource remains locked, a processor typically repeatedly executes instructions to check a value of the lock before continuing with program execution. Likewise, each operation using the software lock introduces a processing delay due to accessing, comparing, and/or writing a value to the portion of memory storing the software lock.

III. SUMMARY

In a particular embodiment, a system is disclosed that includes a translation lookaside buffer (TLB) shared by multiple processing threads of a multithreaded processor. The system includes a TLB lock bit in a register of the multithreaded processor. The system also includes a control logic circuit configured to put a particular thread of the multiple processing threads to sleep in response to the TLB lock bit having a locked configuration when a TLB miss event associated with the particular thread is detected.

In another particular embodiment, a system is disclosed that includes means for indicating a lock status of a shared resource in a multithreaded processor. The system includes means for automatically locking the shared resource before processing exception handling instructions associated with the shared resource. The system further includes means for unlocking the shared resource.

In another embodiment, a method is disclosed that includes receiving a translation lookaside buffer (TLB) miss event associated with a thread of a multi-threaded processor. The method also includes checking a TLB lock indicator. When the TLB lock indicator is unlocked, the method allows access by the thread to an exception handler associated with a TLB using a control logic circuit. When the TLB lock indicator is locked, the method puts the thread to sleep using the control logic circuit.

In another embodiment, a method is disclosed that includes receiving a translation lookaside buffer (TLB) miss event associated with a thread of a multi-threaded processor. The thread has access to a shared translation lookaside buffer (TLB). The method includes reading a TLB lock indicator and when the TLB lock indicator is locked, putting the thread to sleep using a control logic circuit. The method also includes waking the thread upon receipt of an instruction.

In another embodiment, a computer readable medium having processor executable instructions is disclosed. The processor executable instructions cause a processor to handle an exception associated with a resource that is shared by multiple threads of a multi-threaded processor. The processor executable instructions also cause a processor to unlock a hardware lock for the resource after the exception has been handled.

One particular advantage provided by disclosed embodiments is faster lock and unlock operations of a shared resource due to using a logic circuit to set a register bit to lock the shared resource. Another particular advantage provided by disclosed embodiments is reduced dynamic power consumption of threads awaiting access to a shared resource by putting the threads to sleep until the shared resource becomes available.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
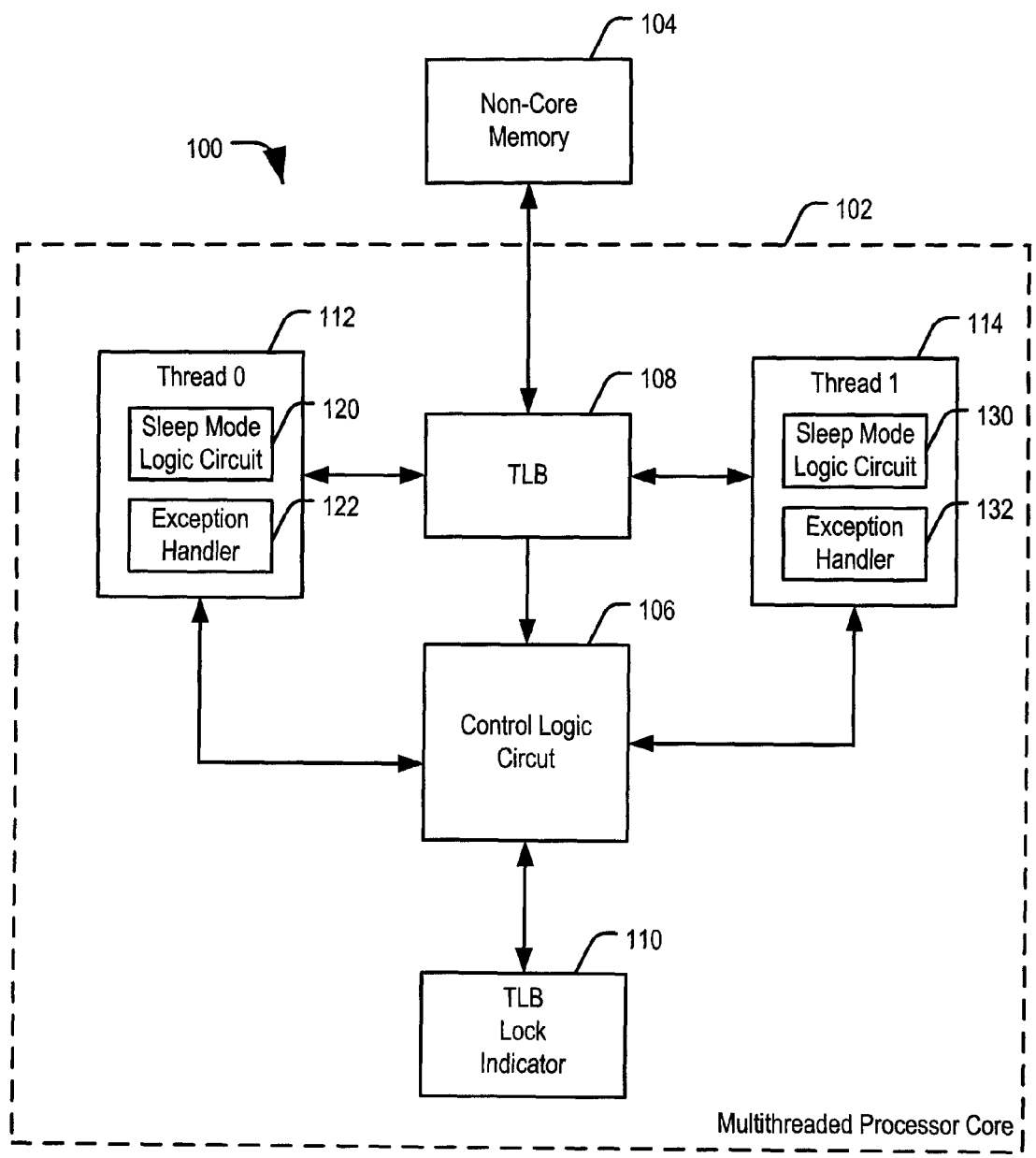
FIG. 1 is a block diagram of an embodiment of a system that includes a multithreaded processor with a lock indicator.

Referring to FIG. 1, a particular illustrative embodiment of a system that includes a multithreaded processor with a lock indicator is depicted and generally designated 100. The system 100 includes a multithreaded processor core 102 coupled to a non-core memory 104. The multithreaded processor core 102 includes a control logic circuit 106 coupled to a translation lookaside buffer (TLB) 108 and coupled to a TLB lock indicator 110. A first thread 112 is operatively coupled to the TLB 108 and to the control logic circuit 106. A second thread 114 is also operatively coupled to the TLB 108 and to the control logic circuit 106. Although two representative threads 112 and 114 are depicted in the system 100, it will be understood that the multithreaded processor core 102 may include any number or threads.

In a particular embodiment, the TLB 108 is a shared memory resource of the multithreaded processor core that is configured to receive requests from multiple threads, such as threads 112 and 114, to translate virtual addresses to physical addresses. The TLB 108 is configured to return a physical address that corresponds to a virtual address that is stored at the TLB 108. The TLB 108 is configured to signal a TLB miss event to the control logic circuit 106 when a requested virtual address is not found at the TLB 108.

In a particular embodiment, the control logic circuit 106 is configured to receive one or more TLB miss event signals from the TLB 108 and to determine the status of the TLB lock indicator 110. When the TLB lock indicator 110 is in a locked configuration, the control logic circuit 106 may be configured to instruct the requesting thread 112 or 114 to save a current processing state and put the thread to sleep. Otherwise, when the TLB lock indicator 110 has an unlocked configuration, the control logic circuit 106 may be configured to lock the TLB lock indicator 110 and to concurrently instruct the requesting thread 112 or 114 to launch an exception handler to process the TLB miss event. By locking the TLB lock indicator 110, other threads are prevented from modifying the TLB 108 so that the requesting thread can safely modify contents at the TLB 108 without the possibility of unpredictable behavior arising from simultaneous data write operations to an entry of the TLB 108 by multiple threads.

In a particular embodiment, the TLB lock indicator 110 may include one or more bits of a global status register of the multithreaded processor core 102. The TLB lock indicator 110 may be responsive to control signals from the control logic circuit 106. The TLB lock indicator 110 has a locked configuration to indicate that at least one thread 112 or 114 is performing a write operation at the TLB 108 and that access to the TLB by other threads is restricted. For example, other threads may be restricted to read-only access, no access, or a reduced level of access to the TLB 108 when the TLB lock indicator 110 is in a locked configuration. In addition, the TLB lock indicator 110 has an unlocked configuration, enabling normal access to the TLB 108 by the threads 112 and 114.

In a particular embodiment, the first thread 112 includes a sleep mode logic circuit 120 and an exception handler 122. The sleep mode logic circuit 120 may be configured to save a current state of the first thread 112, such as by saving a value of program counter (PC) (not shown), in response to a sleep instruction received from the control logic circuit 106. In addition, the sleep mode logic circuit 120 may be configured to store one or more values in a status register (not shown), such as a user mode status bit, an exception status bit, and data related to a last executed instruction packet that caused the TLB miss event.

Generally, the exception handler 122 of the first thread 112 may fetch and execute instructions to handle an exception associated with a resource that is shared by the threads 112 and 114, and to unlock a hardware lock for the resource after the exception has been handled. In a particular embodiment, the exception handler 122 includes logic and processor executable instructions to respond to a TLB miss event. For example, after the first thread 112 receives an instruction from the control logic circuit 106 to launch the exception handler 122, the exception handler 122 may set one or more status bits of the first thread 112 and may cause the first thread 112 to enter a supervisor mode and to load TLB miss exception handling instructions, such as instructions from the non-core memory 104. The exception handler 122 may be operable to fetch and execute instructions that enable recovery from the TLB miss event. For example, the exception handler 122 may process instructions causing the requested virtual address that triggered the TLB miss event to be located at a non-core memory resource, such as a page table. The exception handler 122 may write or program a translation of the virtual address into the TLB 108. The exception handler 122 may also be configured to execute a return instruction to exit an exception handling mode. The return instruction may be operable to return the thread 112 to a non-exception state and may request the control logic circuit 106 to unlock the TLB lock indicator 110. Alternatively, the return instruction may unlock the TLB lock indicator 110 upon return from the exception state without sending an unlock request to the control logic circuit 106.

Likewise, in a particular embodiment, the second thread 114 includes a sleep mode logic circuit 130 and an exception handler 132. In an illustrative embodiment, the second thread 114, including the sleep mode logic circuit 130 and the exception handler 132, operates substantially similarly to the first thread 112, including the sleep mode logic circuit 120 and the exception handler 122 of the first thread 112, respectively.

During operation, multiple processing threads, such as the representative threads 112 and 114, may send virtual address translation requests to the TLB 108. When a TLB miss event results, the control logic circuit 106 may lock the TLB 108 using the TLB lock indicator 110 to exclude other threads from modifying data at the TLB 108 while exception handling instructions respond to the TLB miss event. For example, the TLB lock indicator 110 may include one or more bits in a global control register that may be set by the control logic circuit 106 to indicate that the TLB 108 is locked from access by the other threads.

In an illustrative embodiment, the control logic circuit 106 is configured to set the TLB lock indicator 110 via a built-in hardware process and not by executing instructions of a software process, enabling a faster response to the TLB miss event, improved processor performance, and reduced vulnerability to malicious or poorly-behaved software applications. Additional performance benefits are enabled by using a global register bit in the multithreaded processor core 102 as the TLB lock indicator 110. For example, the control logic circuit 106 may be configured to directly set, clear, and determine a status of the TLB lock indicator 110, so that a response to a TLB miss event may be significantly faster than storing or retrieving a lock indicator value such as a semaphore at the non-processor core memory 104.

When the TLB 108 is locked due to a TLB miss event, the control logic circuit 106 may instruct the thread 112 or 114 that generated the TLB miss event to launch the exception handler 122 or 132 to respond to the TLB miss event. When the control logic circuit 106 receives a return instruction or other signal from the exception handler 122 or 132 that indicates that the TLB miss event has been handled, the control logic circuit 106 may unlock the TLB lock indicator 110.

In a particular embodiment, while the TLB 108 is locked for exception handling by the first thread 112, the second thread 114 may also request a virtual address translation that results in a TLB miss event. Upon being informed of the TLB miss event associated with the second thread 114, the control logic circuit 106 may determine that the TLB lock indicator 110 is in a locked configuration, and may instruct the second thread 114 to go to sleep. For example, the control logic circuit 106 may instruct the second thread 114 to save a current state, to record an address of a last executed packet that caused the TLB miss event, and to enter a wait state during which the second thread 114 does not process instructions. Additional threads may encounter TLB miss events while the TLB lock indicator 110 remains locked and may also be put to sleep by the control logic circuit 106.

When the control logic circuit 106 is informed that the TLB miss event associated with the first thread 112 has been handled, such as via a return instruction executed by the exception handler 122, the control logic circuit 106 unlocks the TLB lock indicator 110 and determines whether one or more processing threads are asleep due to the TLB 108 being locked. If so, the control logic circuit 106 awakens one or more of the sleeping threads, such as the second thread 114, to resume processing.

For example, the second thread 114 may be awakened and may replay the instruction packet that was executed immediately prior to the second thread 114 being put to sleep and that resulted in the TLB miss event. The replayed instruction packet may repeat a request for translation of a virtual address at the TLB 108. As a result of the exception handling performed by the first thread 112, the virtual address translation requested by the second thread may potentially be stored in the TLB 108. If not, a second TLB miss event occurs, and in response the control logic circuit 106 resets the TLB lock indicator 110 to the locked configuration and instructs the exception handler 132 of the second thread 114 to begin processing instructions to handle the second TLB miss event.

Figure 2:
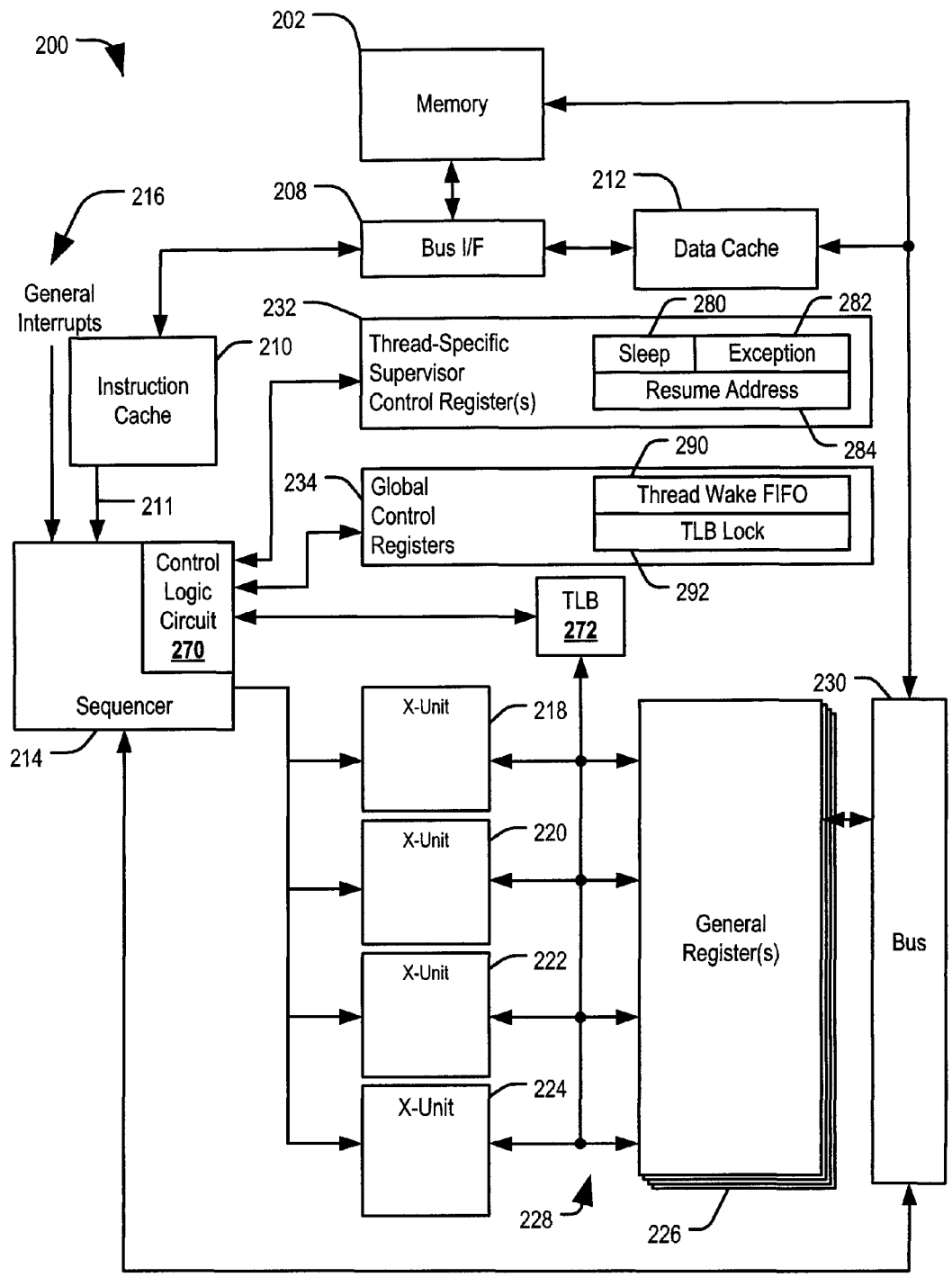
FIG. 2 is an example of a block diagram of an embodiment of a processing system that includes a hardware lock for a shared resource.

Referring to FIG. 2, a particular illustrative embodiment of a processing system that includes a hardware lock for a shared resource is depicted and generally designated 200. The processing system 200 includes a memory 202 that is coupled to an instruction cache 210 via a bus interface 208. The processing system 200 also includes a data cache 212 that is coupled to the memory 202 via the bus interface 208. The instruction cache 210 is coupled to a sequencer 214 via a bus 211. In a particular example, the sequencer 214 can also receive general interrupts 216, which may be retrieved from an interrupt register (not shown). In a particular embodiment, the instruction cache 210 is coupled to the sequencer 214 via a plurality of current instruction registers, which may be coupled to the bus 211 and associated with particular threads of the processing system 200. In a particular embodiment, the processing system 200 is an interleaved multi-threaded processor including six threads.

In a particular embodiment, the bus 211 is a sixty-four (64)-bit bus and the sequencer 214 is configured to retrieve instructions from the memory 202 via instruction packets that include multiple instructions having a length of thirty-two (32) bits each. The bus 211 is coupled to a first instruction execution unit 218, a second instruction execution unit 220, a third instruction execution unit 222, and a fourth instruction execution unit 224. Each instruction execution unit 218, 220, 222, 224 can be coupled to a general register file 226 via a second bus 228. The general register file 226 can also be coupled to the sequencer 214 and to the data cache 212 via a third bus 230.

The sequencer 214 includes or is otherwise coupled to a control logic circuit 270 that has access to thread-specific supervisor control registers 232 and to global control registers 234. The control logic circuit 270 is further coupled to a translation lookaside buffer (TLB) 272. The TLB 272 is accessible to one or more of the execution units 218, 220, 222, and 224 to provide virtual-to-physical address translations and to signal a TLB miss event to the control logic circuit 270 when a requested address is not stored at the TLB 272.

In a particular embodiment, each thread-specific supervisor control register 232 includes multiple bit fields, such as a sleep field 280, an exception field 282, and a resume address field 284. The sleep field 280 may store one or more values or bit settings that indicate whether the associated thread is to transition between an active state and a sleep state. The exception field 282 may store one or more values to indicate a general exception or a particular type of exception, such as a TLB miss exception. The resume address field 284 may store an address or pointer to locate an instruction or execution packet to resume execution when the thread awakens. For example, when a thread is put to sleep in response to a TLB miss event that occurs while the TLB 272 is locked, the thread may store the address of the instruction that caused the TLB miss event to the resume address field 284. In a particular embodiment, when a value of the sleep field 280 transitions from a sleep indicator to an awake indicator, the associated thread may reload the instruction or execution packet indicated by the value stored at the resume address field 284 and begin execution.

In a particular embodiment, the global control registers 234 include one or more fields to indicate an order to awaken sleeping threads, such as a thread wake first-in-first-out buffer (FIFO) 290. The thread wake FIFO 290 may include one or more indicators to identify one or more of the processing threads of the system 200 that have been put to sleep in response to a TLB miss event occurring while a TLB lock 292 is in a locked configuration. The thread wake FIFO 290 may be configured to store thread indicators in an order that the threads are put to sleep, such that the control logic circuit 270 is operable to revive the sleeping threads in a matching order. The TLB lock 292 may include a single bit, the value of which indicates whether the TLB 272 is in a locked state or an unlocked state.

In a particular embodiment, the control logic circuit 270 is configured to receive an indication of one or more TLB miss events at the TLB 272. The control logic circuit 270 may be configured to respond to a TLB miss event by first checking a status of the TLB lock 292. When the TLB lock 292 indicates that the TLB 272 is unlocked, the control logic circuit 270 may transition the TLB lock value 292 to a locked status and write a value to the exception field 282 of the corresponding thread-specific supervisor control register 232 to indicate that a TLB miss event has occurred and to instruct the thread to launch an exception handler.

The control logic circuit 270 may further be configured to receive an instruction or signal from the exception handler when the TLB miss event has been handled, such as when the virtual address translation which caused the TLB miss event has been programmed to the TLB 272. In response, the control logic circuit 270 may be configured to unlock the TLB lock 292, and to check the thread wake FIFO 290 to determine whether one or more threads should be awakened. If so, the control logic circuit 270 is configured to awaken one or more of the threads, in order of storage at the thread wake FIFO 290, in an order of processing at the processing system 200, or in an order determined via one or more algorithms, such as based on a thread priority, by other mechanisms, or any combination thereof.

The control logic circuit 270 may be configured to respond to a TLB miss event that occurs while the TLB lock 292 has a locked status, such as during exception handling by another thread that includes modifying at least one entry at the TLB 272. The control logic circuit 270 may be configured to write to the thread-specific supervisor control registers 232 to instruct the thread associated with the recent TLB miss event to store an address of a recent instruction or execution packet to the resume address field 284 and to go to sleep without initiating an exception handler associated with the recent TLB miss event. The control logic 270 may also be configured to not increment a program counter associated with the current thread when the current thread is put to sleep. The control logic circuit 270 may further be configured to store an identifier of the current thread at the thread wake FIFO 290.

Figure 3:
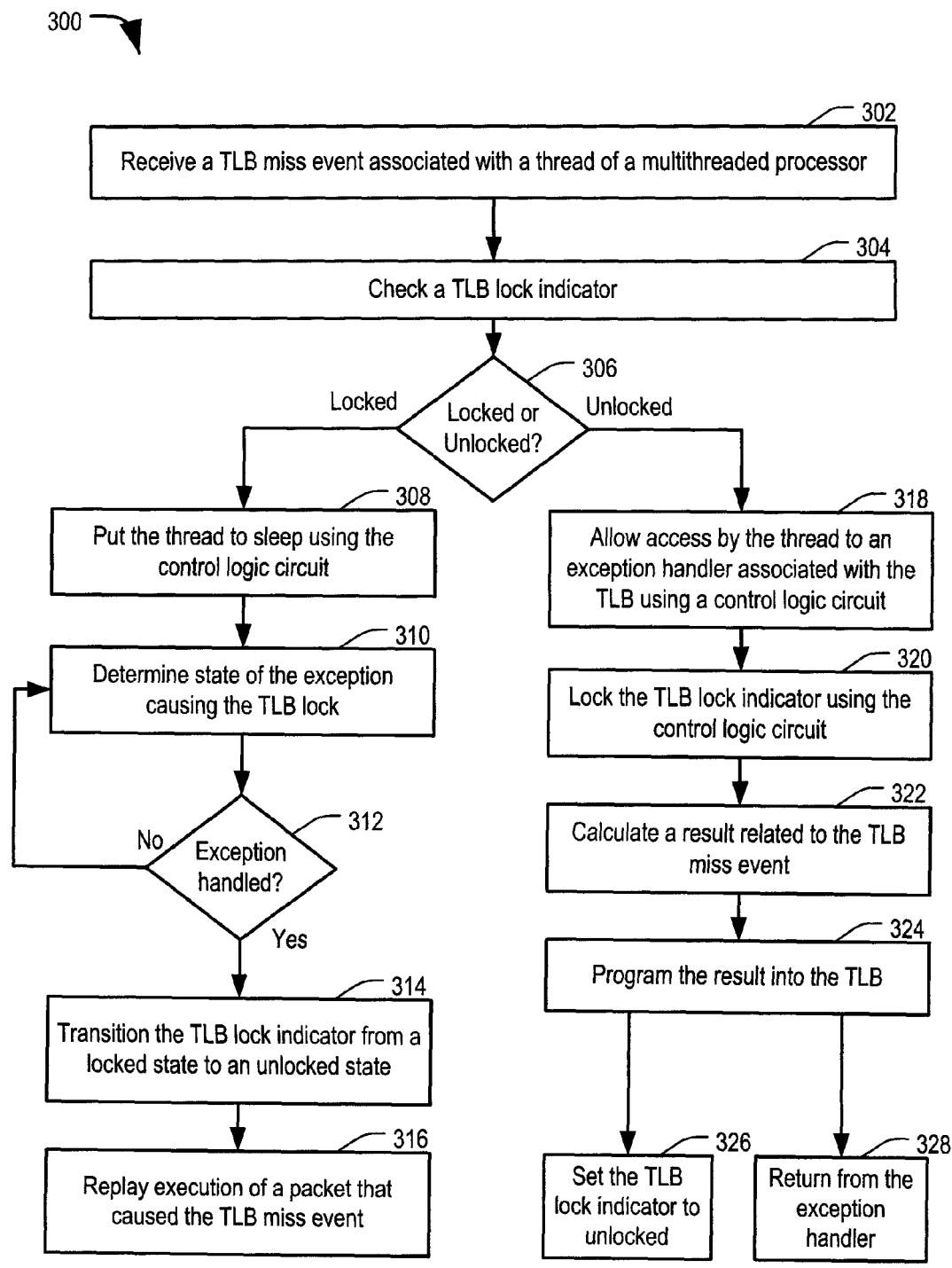
FIG. 3 is a flow chart of an embodiment of a method of using a lock indicator at a multithreaded processor.

Referring to FIG. 3, a particular illustrative embodiment of a method of using a lock indicator at a multithreaded processor is depicted and generally designated 300. In the illustrative embodiment of FIG. 3, the lock indicator is a hardware lock, such as a register bit, associated with a translation lookaside buffer (TLB) that is shared between multiple processing threads. In an illustrative embodiment, the method 300 may be performed by a control logic circuit of a multithreaded processor, such as the control logic circuit 106 of FIG. 1 or the control logic circuit 270 of FIG. 2.

At 302, a TLB miss event associated with a thread of a multi-threaded processor is received. In a particular embodiment, the TLB miss event occurs at a software managed TLB. Continuing to 304, a TLB lock indicator is checked. The TLB lock indicator may include one or more register bits of a global control register, such as the TLB lock 292 of FIG. 2. Proceeding to 306, a determination is made whether the TLB lock indicator is locked or unlocked.

When the TLB lock indicator is determined to be locked, processing advances to 308, where the thread is put to sleep using the control logic circuit. Proceeding to 310, in a particular embodiment, a state of the exception handler causing the TLB lock is determined. Moving to 312, when the exception is determined to have not been handled, such as when the exception handler has not completed operations, processing may return to 310. When the exception is determined to be handled, in a particular embodiment, processing continues at 314, where the TLB lock indicator is transitioned from a locked state to an unlocked state. Proceeding to 316, after the TLB lock indicator transitions from the locked state to the unlocked state, execution of a packet that caused the TLB miss event may be replayed.

Returning to 306, when the TLB lock indicator is determined to be unlocked, processing advances to 318, where access by the thread to an exception handler associated with the TLB is allowed using a control logic circuit. Proceeding to 320, the TLB lock indicator is locked using the control logic circuit when access is allowed. In an illustrative embodiment, the exception handler sets the TLB lock indicator to a locked state.

Moving to 322, a result related to the TLB miss event may be calculated. For example, a virtual address translation for an address not located at the TLB may be determined by accessing a page table. Continuing to 324, in a particular embodiment, the result from the page table is programmed into the TLB.

Advancing to 326, the TLB lock indicator is set to unlocked. Concurrently with unlocking the TLB lock indicator, processing returns from the exception handler, at 328. In a particular embodiment, the TLB lock indicator is automatically unlocked upon returning from the exception handler.

Figure 4:
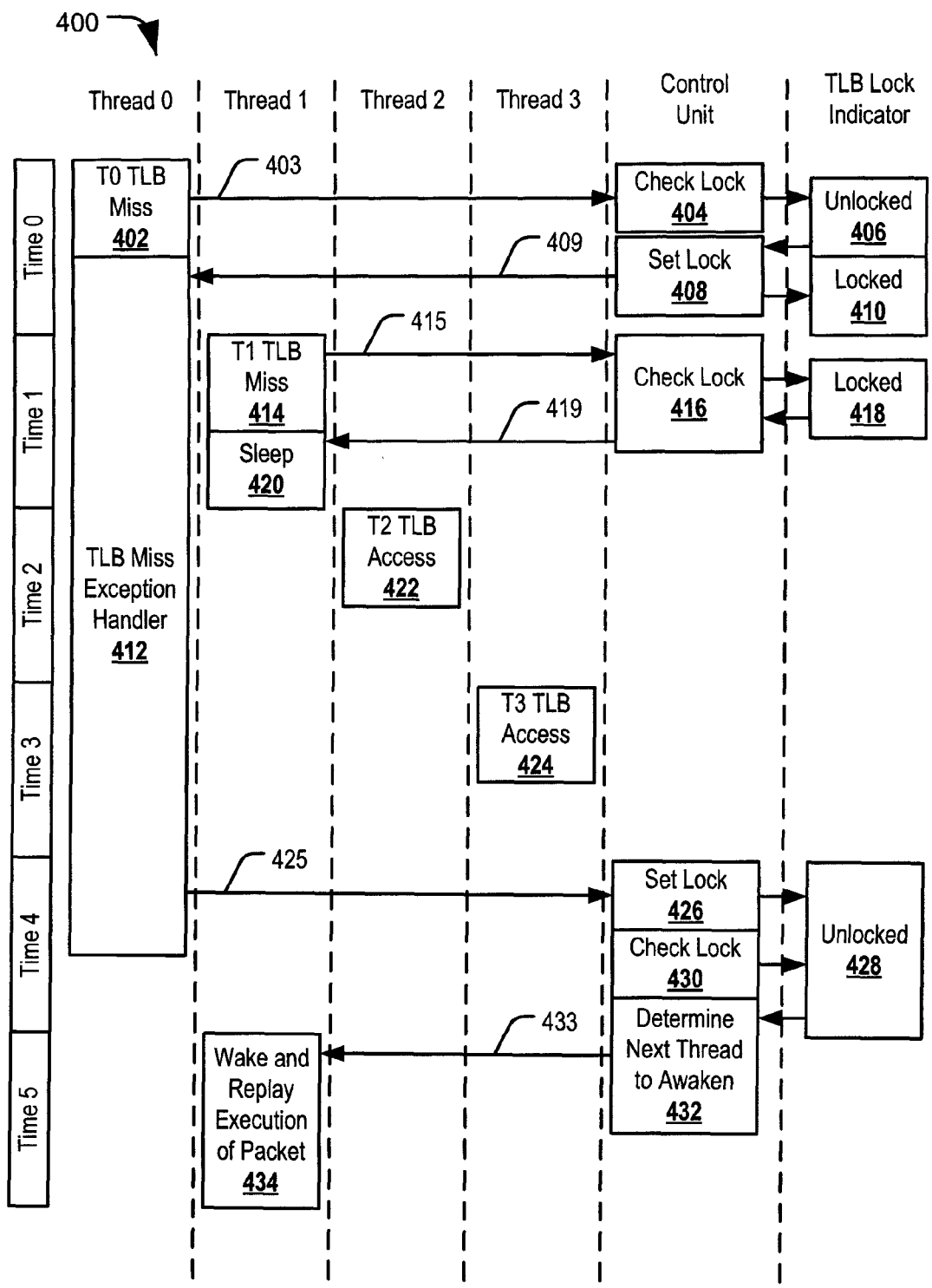
FIG. 4 is a general diagram depicting an embodiment of operations at a multithreaded processor with a lock indicator.

Referring to FIG. 4, a particular illustrative embodiment of operations at a multithreaded processor with a lock indicator for a shared resource is depicted and generally designated 400. The diagram 400 illustrates operations associated with multiple threads, such as the representative threads: thread 0, thread 1, thread 2, and thread 3. Operations associated with a control unit and with a TLB lock indicator are also illustrated. A temporal relationship between operations is identified by six representative sequential time periods, labeled time 0-time 5. In a particular embodiment, the control unit may include a control logic circuit, such as the control logic circuit 108 of FIG. 1 or the control logic circuit 270 of FIG. 2.

At time 0, TLB access is reserved for thread 0, and thread 0 encounters a TLB miss event 402. In response to the TLB miss event 402, a signal 403 is sent to the control unit. Upon receiving the signal 403, the control unit processes a check lock operation 404. The check lock operation 404 determines whether the TLB lock indicator is in a locked or unlocked configuration. In the illustrative embodiment of FIG. 4, the check lock operation 404 determines that the TLB lock indicator is in an unlocked state 406.

In response to determining that the TLB lock indicator is in the unlocked state 406, the control unit performs a set lock operation 408 to transition the TLB lock indicator to a locked state 410. In addition, the control unit sends a signal 409 to thread 0. In response to the signal 409, thread 0 launches a TLB miss exception handler 412.

During time 1, TLB access is reserved for thread 1. While thread 0 is executing the TLB miss exception handler 412, thread 1 performs a TLB access attempt that also results in a TLB miss event 414. The TLB miss event 414 is communicated to the control unit via a signal 415. The control unit performs a check lock operation 416 that determines that the TLB lock indicator is in a locked state 418. Because the TLB lock indicator is in the locked state 418, the control unit sends a signal 419 instructing thread 1 to sleep at 420. In response to the signal 419, thread 1 saves a current state of the thread, such as by storing a program counter value, thread context values, other state information, or any combination thereof, and enters a state of reduced activity.

During time 2, TLB access is reserved for thread 2. While thread 0 continues to execute the TLB miss exception handler 412 and while thread 1 is asleep, thread 2 may perform a TLB access operation 422. Likewise, during time 3, TLB access is reserved for thread 3, which may perform a TLB access operation 424.

During time 4, the TLB miss exception handler 412 of thread 0 finishes processing. For example, TLB miss exception handler 412 may have accessed a page table, determined the virtual address translation that caused the TLB miss event 402, programmed the translation to the TLB, and executed a return instruction. A signal 425 informs the control unit that the TLB miss exception handler 412 has completed. In response to the TLB miss exception handler 412 completing, the control unit performs a set lock operation 426 to transition the TLB lock indicator to an unlocked configuration 428.

The control logic circuit may perform a check lock operation to determine when the TLB lock indicator is no longer in the locked state 418. For example, the check lock operation may be engaged in periodically by the control unit, at designated intervals in response to designated events determined by the control unit, or automatically in response to signals indicating a completion of an exception handler, such as the signal 425. In response to the set lock operation 426, or in response to a check lock operation 430, or any combination thereof, the TLB lock indicator is determined to be in an unlocked state 428.

The control unit determines the next thread to awaken, at 432. As illustrated in FIG. 4, thread 1 was the first thread put to sleep in response to a TLB miss while the TLB lock indicator was in the locked state 418. Therefore, at time 5, the control unit sends a signal 433 to awaken thread 1, in response to which thread 1 performs a wake operation and replays execution of instruction packet operation at 434.

In a particular embodiment, the wake and replay execution of packet operation 434 reloads the previous state of thread 1 that was saved prior to thread 1 being put to sleep at 420, and replays execution of the packet that generated the TLB miss event 414. In a particular embodiment, the requested virtual address may have been loaded into the TLB by the TLB miss exception handler 412. Otherwise, another TLB miss event may result from replaying execution of the instruction packet at 434, to which the control unit may respond in a manner substantially similar as for the TLB miss 402.

Figure 5:
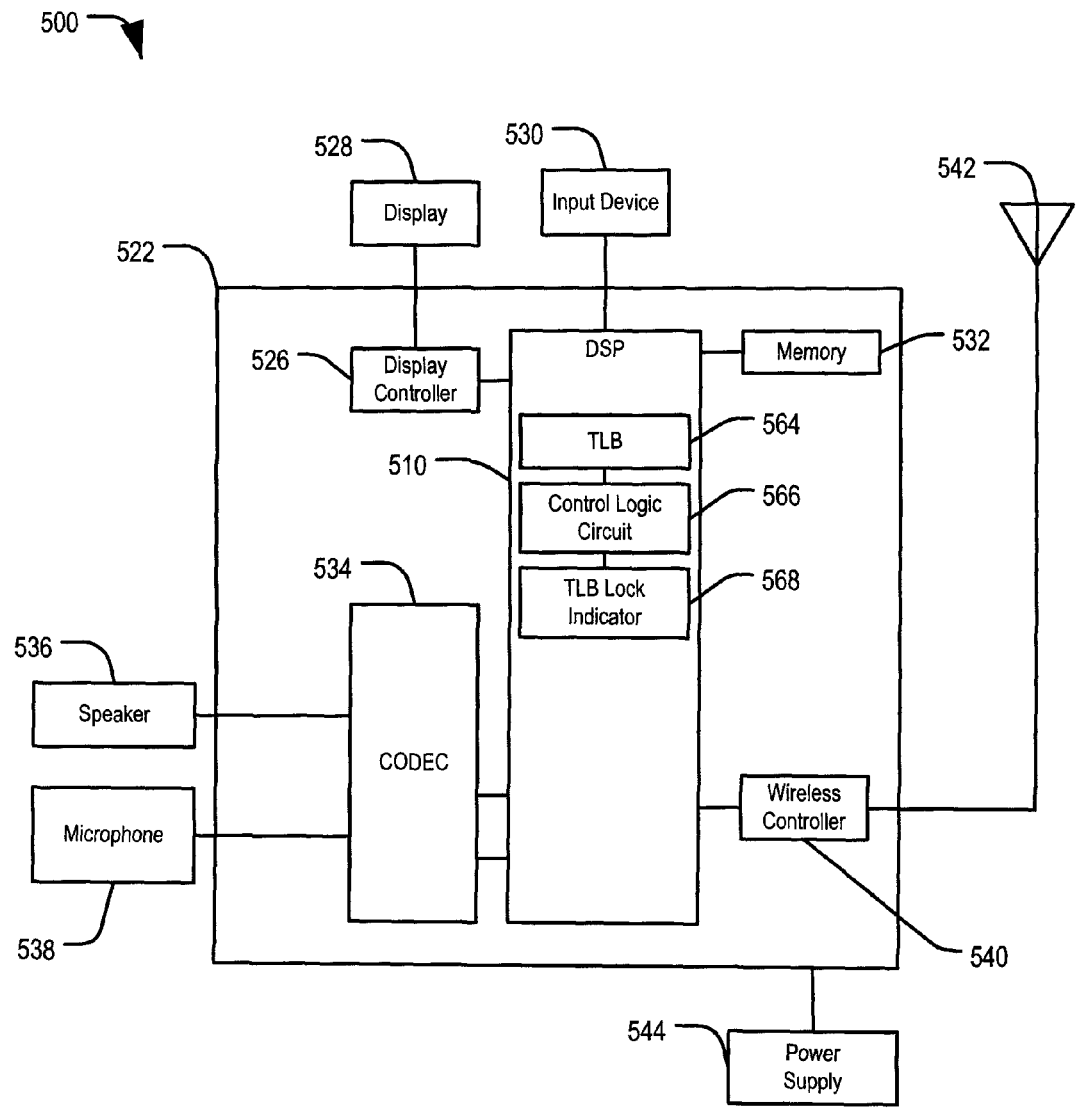
FIG. 5 is a block diagram of an illustrative communication device that includes a multithreaded processor with a lock indicator for a shared resource.

FIG. 5 is a block diagram of a representative wireless communication device 500 that includes a multithreaded processor with a lock indicator for a shared resource. The wireless communications device 500 includes a multithreaded digital signal processor (DSP) 510 that includes a shared resource, such as a TLB 564, and a control logic circuit 566 coupled to the TLB 564 and further coupled to a TLB lock indicator 568. The control logic circuit 566 is configured to operate in accordance with the systems and methods as described with respect to FIGS. 1-4.

FIG. 5 also shows a display controller 526 that is coupled to the digital signal processor 510 and to a display 528. Moreover, an input device 530 is coupled to the digital signal processor 510. Additionally, a memory 532 is coupled to the digital signal processor 510. A coder/decoder (CODEC) 534 can also be coupled to the digital signal processor 510. A speaker 536 and a microphone 538 can be coupled to the CODEC 534.

FIG. 5 also indicates that a wireless controller 540 can be coupled to the digital signal processor 510 and to a wireless antenna 542. In a particular embodiment, a power supply 544 is coupled to the on-chip system 522. Moreover, in a particular embodiment, as illustrated in FIG. 5, the display 528, the input device 530, the speaker 536, the microphone 538, the wireless antenna 542, and the power supply 544 are external to the on-chip system 522. However, each is coupled to a component of the on-chip system 522.

It should be understood that the control logic circuit 566 need not be limited to controlling requests to access the TLB 564 in conjunction with the TLB lock indicator 568. Instead, the control logic circuit 566 may be operable to control access to one or more other shared resources, such as the display controller 526, the CODEC 534, the wireless controller 540, any other component of the DSP 510 or coupled to the DSP 510, or any combination thereof.

In connection with the disclosed systems and methods, illustrative examples of mechanisms for indicating a lock status of a shared resource in a multithreaded processor are provided, such as the TLB lock indicator 110 of FIG. 1 and the TLB lock 292 of FIG. 2. The shared resource may be automatically locked before processing exception handling instructions associated with the shared resource by operation of control circuitry, such as the control logic circuit 106 of FIG. 1 and the control logic circuit 270 of FIG. 2. The shared resource may also be unlocked by operation of control circuitry, such as the control logic circuit 106 of FIG. 1 and the control logic circuit 270 of FIG. 2, or by operation of executable instructions, such as one or more instructions of an exception handler to unlock the shared resource.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    receiving a translation lookaside buffer (TLB) miss event associated with a first thread of a multithreaded processor;
    checking a TLB lock indicator, wherein the TLB lock indicator includes a bit stored at a control register;
    in response to the TLB lock indicator indicating an unlocked state, allowing access by the first thread to an exception handler associated with a TLB; and
    in response to the TLB lock indicator indicating a locked state:
    putting the first thread to sleep, wherein putting the first thread to sleep is performed by a sleep mode circuit in response to receiving a sleep instruction from a control circuit;
    transitioning the TLB lock indicator from the locked state to the unlocked state; and
    in response to the TLB lock indicator transitioning from the locked state to the unlocked state, replaying execution of a packet that caused the TLB miss event.

2. The method of claim 1, further comprising locking setting the TLB lock indicator to the locked state when access is allowed.

3. The method of claim 1, wherein checking the TLB lock indicator is performed by the control circuit of the multithreaded processor in response to the TLB miss event.

4. The method of claim 1, further comprising, in response to the TLB lock indicator transitioning from the locked state to the unlocked state, waking the first thread and a second thread, wherein an order to wake the first thread and the second thread is determined by a processing order associated with the first thread and the second thread, a thread priority order associated with the first thread and the second thread, or a combination thereof.

5. The method of claim 1, further comprising:
calculating a result related to the TLB miss event;
programming the result into the TLB; and
setting the TLB lock indicator to the unlocked state.

6. The method of claim 5, further comprising automatically setting the TLB lock indicator to the unlocked state upon returning from the exception handler.

7. The method of claim 1, wherein the exception handler sets the TLB lock indicator to the locked state.

8. A method comprising:
receiving a translation lookaside buffer (TLB) miss event associated with a thread of a multithreaded processor, the thread having access to a shared translation lookaside buffer (TLB);
reading a TLB lock indicator and in response to the TLB lock indicator indicating a locked state, putting the thread to sleep, wherein the TLB lock indicator comprises a bit stored at a control register, and wherein putting the thread to sleep is performed by a sleep mode circuit in response to receiving a sleep instruction from a control circuit;
in response to receipt of an instruction, waking the thread; and
in response to the TLB lock indicator transitioning from the locked state to an unlocked state, replaying execution of an instruction packet that caused the TLB miss event.

9. The method of claim 8, wherein the TLB is reserved for a first thread during a first time period, wherein the TLB is reserved for a second thread during a second time period, and wherein a third thread is put to sleep during the first time period and the second time period.

10. The method of claim 9, wherein the third thread is awakened during a third time period.

11. The method of claim 10, further comprising, after awakening the third thread, replaying execution of an instruction packet that was executed by the third thread prior to the third thread being put to sleep.

12. A method, comprising:
receiving a translation lookaside buffer (TLB) miss event associated with a first thread of a multithreaded processor;
checking a TLB lock indicator, wherein the TLB lock indicator includes a bit stored at a control register, and wherein checking the TLB lock indicator is performed by a control circuit of the multithreaded processor in response to the TLB miss event;
if the TLB lock indicator is unlocked, allowing access by the first thread to an exception handler associated with a TLB;
if the TLB lock indicator is locked:
putting the first thread to sleep, wherein putting the first thread to sleep is performed by a sleep mode circuit in response to receiving a sleep instruction from the control circuit;
transitioning the TLB lock indicator from a locked state to an unlocked state; and
after transitioning the TLB lock indicator from the locked state to the unlocked state, replaying execution of a packet that caused the TLB miss event.

13. The method of claim 12, wherein a value of the bit stored at the control register indicates whether threads of the multithreaded processor are temporarily restricted from modifying all data at the TLB.

14. The method of claim 12, wherein replaying execution of the packet that caused the TLB miss event comprises repeating a request to translate a virtual address at the TLB.

15. The method of claim 12, wherein the packet is an instruction packet that includes a first instruction and a second instruction.

16. A system comprising:
a translation lookaside buffer (TLB) shared by multiple processing threads of a multithreaded processor;
a TLB lock bit in a register of the multithreaded processor; and
a control logic circuit configured to:
in response to the TLB lock bit having a locked configuration:
send a sleep instruction to a sleep mode circuit to put a first thread of the multiple processing threads to sleep in response to detecting a first TLB miss event associated with the first thread,
transition the TLB lock bit from the locked configuration to an unlocked configuration, and
in response to transitioning the TLB lock bit from the locked configuration to the unlocked configuration, replaying an execution packet that caused the first TLB miss event.

17. The system of claim 16, wherein the first TLB miss event is associated with the execution packet of the first thread, and wherein the control logic circuit is further configured to store the execution packet and to not increment a program counter associated with the first thread when the first thread is put to sleep.

18. The system of claim 16, wherein the first thread is put to sleep without launching an exception handler in response to the first TLB miss event.

19. The system of claim 16, wherein the control logic circuit is further configured to set the TLB lock bit to the locked configuration and to concurrently initiate an exception handler associated with the first TLB miss event in response to the TLB lock bit having the unlocked configuration.

20. The system of claim 19, wherein the TLB lock bit is configured to be set to the unlocked configuration by an instruction of the exception handler.

21. The system of claim 19, wherein the TLB lock bit is configured to be set to the locked configuration by the control logic circuit.

22. The system of claim 16, wherein the control logic circuit is configured to store data indicating an order to awaken the first thread when a second thread of the multiple processing threads is also put to sleep in response to a second TLB miss event.

23. The system of claim 16, further comprising a first control register that includes:
a sleep field that indicates whether the first thread is to transition between a sleep state and an active state;
an exception field that indicates a type of exception to which the first thread is responsive; and
a return address field that indicates an instruction to begin executing after the first thread is awoken.

24. A system comprising:
means for storing a bit indicating a lock status of a shared resource in a multithreaded processor;
means for automatically setting the shared resource to a locked state before processing exception handling instructions to handle a processing exception associated with the shared resource;
means for saving a state of a thread;
means for putting the thread to sleep after the state of the thread has been saved in response to receiving a sleep instruction from a control circuit while the lock status of the shared resource indicates the locked state;

means for setting the lock status of the shared resource to the unlocked state; and means for replaying execution of an instruction packet that caused the processing exception associated with the shared resource, in response to the lock status of the shared resource transitioning from the locked state to the unlocked state.

25. A computer readable medium having processor executable instructions to cause a processor to:

handle an exception associated with a resource that is shared by multiple threads of a multithreaded processor; and set a hardware lock associated with the resource to a locked state after the exception has been handled; and in response to the hardware lock indicating the locked state:

put a first thread of the multiple threads to sleep in response to detecting an exception associated with the resource caused by the first thread, wherein putting the first thread to sleep is performed by a sleep mode circuit in response to receiving a sleep instruction from a control logic circuit;

transition the hardware lock from the locked state to an unlocked state, and in response to transitioning the hardware lock from the locked state to the unlocked state, replaying execution of an instruction packet that caused the exception associated with the resource by the first thread.

26. The computer readable medium of claim 25, wherein the hardware lock is configured to be set to the locked state by the control logic circuit of the processor before the exception is handled.

27. The computer readable medium of claim 25, wherein the resource that is shared by the multiple threads of the multithreaded processor is a core memory resource of the multithreaded processor.

28. The computer readable medium of claim 27, wherein the core memory resource is a translation lookaside buffer (TLB) and wherein the exception is caused by a TLB miss.

29. The computer readable medium of claim 25, wherein the hardware lock includes at least one bit of a global register.

* * * * *